United States Patent [19]

Vest

[11] Patent Number: 4,592,323
[45] Date of Patent: Jun. 3, 1986

[54] SPEED LIMITING MEANS FOR VARIABLE-SPEED PRIME MOVER

[75] Inventor: Glenn E. Vest, Erie, Pa.

[73] Assignee: General Electric Company, Erie, Pa.

[21] Appl. No.: 714,607

[22] Filed: Mar. 21, 1985

[51] Int. Cl.[4] .......................... F02D 41/06; F02B 77/08
[52] U.S. Cl. .............................. 123/362; 123/196 AB; 123/196 S; 123/198 DB
[58] Field of Search ............. 123/362, 196 AB, 196 S, 123/198 DB, 198 D

[56] References Cited

U.S. PATENT DOCUMENTS

| | | | |
|---|---|---|---|
| 2,021,005 | 11/1935 | Hamilton | 123/362 |
| 3,841,291 | 10/1974 | Ludewig et al. | 123/196 S |
| 4,117,822 | 10/1978 | Mills | 123/198 DB |
| 4,475,498 | 10/1984 | Hurner | 123/196 S |

FOREIGN PATENT DOCUMENTS

| | | | |
|---|---|---|---|
| 98413 | 8/1979 | Japan | 123/362 |
| 2016595 | 9/1979 | United Kingdom | 123/362 |

Primary Examiner—Ira S. Lazarus
Attorney, Agent, or Firm—Albert S. Richardson, Jr.

[57] ABSTRACT

In a diesel-electric locomotive, maximum speed of the diesel engine is automatically limited as a function of the temperature of the engine lubricating oil so as to prevent damage to the engine, to the engine-driven lube oil pump, and to the external components of the engine lube oil system when the oil is relatively cool and hence very viscous.

15 Claims, 5 Drawing Figures

SPEED LIMITING MEANS FOR VARIABLE-SPEED PRIME MOVER

BACKGROUND OF THE INVENTION

This invention relates generally to variable-speed prime movers and their associated lubricating oil and speed control systems, and it relates more particularly to means for protecting the prime mover from damage due to excessive pressure in the lubricating oil system.

Large self-propelled traction vehicles such as locomotives commonly use a thermal prime mover to drive an electrical transmission comprising generating means for supplying electric current to a plurality of direct current (d-c) traction motors whose rotors are drivingly coupled through speed-reducing gearing to the respective axle-wheel sets of the vehicle. The generating means typically comprises a main 3-phase traction alternator whose rotor is mechanically coupled to the output shaft of the prime mover (typically a 16-cylinder turbocharged diesel engine). When excitation current is supplied to field windings on the rotating rotor, alternating voltages are generated in the 3-phase stator windings of the alternator. These voltages are rectified and applied to the armature windings of the traction motors.

During the "motoring" or propulsion mode of operation, a locomotive diesel engine tends to deliver constant power, depending on throttle setting and ambient conditions, regardless of locomotive speed. For maximum performance, the electrical power output of the traction alternator must be suitably controlled so that the locomotive utilizes full engine power. For proper train handling, intermediate power output levels are provided to permit graduation from minimum to full output. But the load on the engine must not exceed whatever level of power the engine can develop. Overloads can cause premature wear, engine stalling or "bogging," or other undesirable effects. Historically, locomotive control systems have been designed so that the operator can select the desired level of traction power, in discrete steps between zero and maximum and so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control console located in the operator's cab of the locomotive. (In addition to the eight conventional power notches, the handle has an "idle" position and a "shutdown" position).

The position of the throttle handle determines the engine speed setting of the associated governor. In a typical governor system, the output piston of an electrohydraulic device is drivingly connected, via a mechanical linkage, to a pair of movable fuel pump racks which in turn are coupled to a plurality of fuel injection pumps that respectively meter the amounts of fuel supplied to the power cylinders of the engine. The governor compares the desired speed (as commanded by the throttle) with the actual speed of the engine, and its output piston moves the fuel racks as necessary to minimize any deviation therebetween.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions the engine power at each notch equals by the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the magnitude of excitation current in the alternator field windings. For the purpose of accurately controlling and regulating the amount of power supplied to the electric load circuit it is common practice to adjust the field strength of the traction alternator to compensate for load changes and minimize the error between actual and desired KVA. The desired power depends on the specific speed setting of the engine. Such excitation control will establish a balanced steady-state condition which results in a substantially constant, optimum electrical power output for each position of the throttle handle.

In practice the above-summarized system of controlling a diesel-electric locomotive also includes suitable means for overriding normal operation of the system and reducing engine load in response to certain temporary abnormal conditions, such as loss of wheel adhesion, low pressure in the lubricating oil system or the engine coolant system, or a load exceeding the power capability of the engine at whatever speed the throttle is commanding. This response, which is generally referred to as "deration," helps the locomotive recover from such conditions and/or prevents serious damage to the engine. In addition, the excitation control system conventionally includes means for limiting or reducing alternator output voltage as necessary to keep the magnitude of this voltage and the magnitude of load current from respectively exceeding predetermined safe maximum levels or limits.

The above-summarized locomotive in practice will sometimes be out of service with its engine not running. When the locomotive is returned to service, there is a possibility that the engine lubricating oil will be cold and hence highly viscous. This is particularly true during cold weather conditions. Once the engine is restarted the lubricating oil, which is circulated by an engine-driven pump, requires some time to warm up and regain its desired low viscosity. As the engine speed increases, so does the speed of the oil pump and the pressure in the lube oil system. To protect the system from overpressure, the lube oil system includes a pressure relief valve. Normally this valve will prevent the oil pressure from rising to a dangerously high level that might damage the oil pump, the oil filter, or the gaskets of the oil cooler that is provided in the engine lube oil system. But the pressure relief valve can malfunction when the viscosity of the oil is relatively high. Excessively high oil pressure can be avoided by limiting the speed of the engine.

Heretofore locomotive operators have been instructed, after starting the diesel engine but before accelerating the locomotive from rest, to allow time for the engine to warm up. In addition, the operators are cautioned to limit engine speed, after start-up during cold weather conditions, to no higher than notch 3 until the engine cooling water has reached 140° F. But such instructions and cautions can be inadvertently or knowingly ignored. In any event, they require the exercise of human judgment and hence are subject to human error.

SUMMARY OF THE INVENTION

A general objective of the present invention is to provide improved means for protecting the lubricating oil system of a prime mover from excessive oil pressure when the lubricating oil is cold.

Another objective is the provision of means for automatically protecting a variable-speed prime mover from damage due to excessive oil pressure.

In carrying out the invention in one form, a variable-speed prime mover is provided with a lubricating oil system comprising a prime mover-driven oil pump and an oil cooler. The prime mover is also provided with speed control means responsive to a speed command signal for regulating its operating speed. The speed command signal is produced by a controller which in turn is connected to a throttle, whereby the value of the speed command signal normally varies with the speed selection of the throttle. A temperature sensor located on the hot oil side of the oil cooler provides a signal representative of the temperature of the lubricating oil. The controller includes maximum speed limiting means responsive to the oil temperature signal for automatically preventing the speed command signal from exceeding a predetermined relatively low value if the sensed oil temperature is below a preset minimum level (e.g., approximately 90° F.). Preferably the maximum speed limiting means is also responsive to the sensed oil temperature rising above the preset minimum level but not above a predetermined higher level (e.g., approximately 140° F.) for automatically preventing the speed command signal from exceeding a predetermined intermediate value which is higher than the aforesaid low value but lower than the normal maximum value of this signal. By restricting the prime mover speed in this manner, excessive oil pressure in the lubricating oil system is avoided during whatever period of time is required for the oil to warm up after starting the prime mover.

The invention will be better understood and its various objects and advantages will be more fully appreciated from the following description taken in conjunction with the accompanying drawings.

DESCRIPTION OF THE PREFERRED EMBODIMENT

Figure 1:
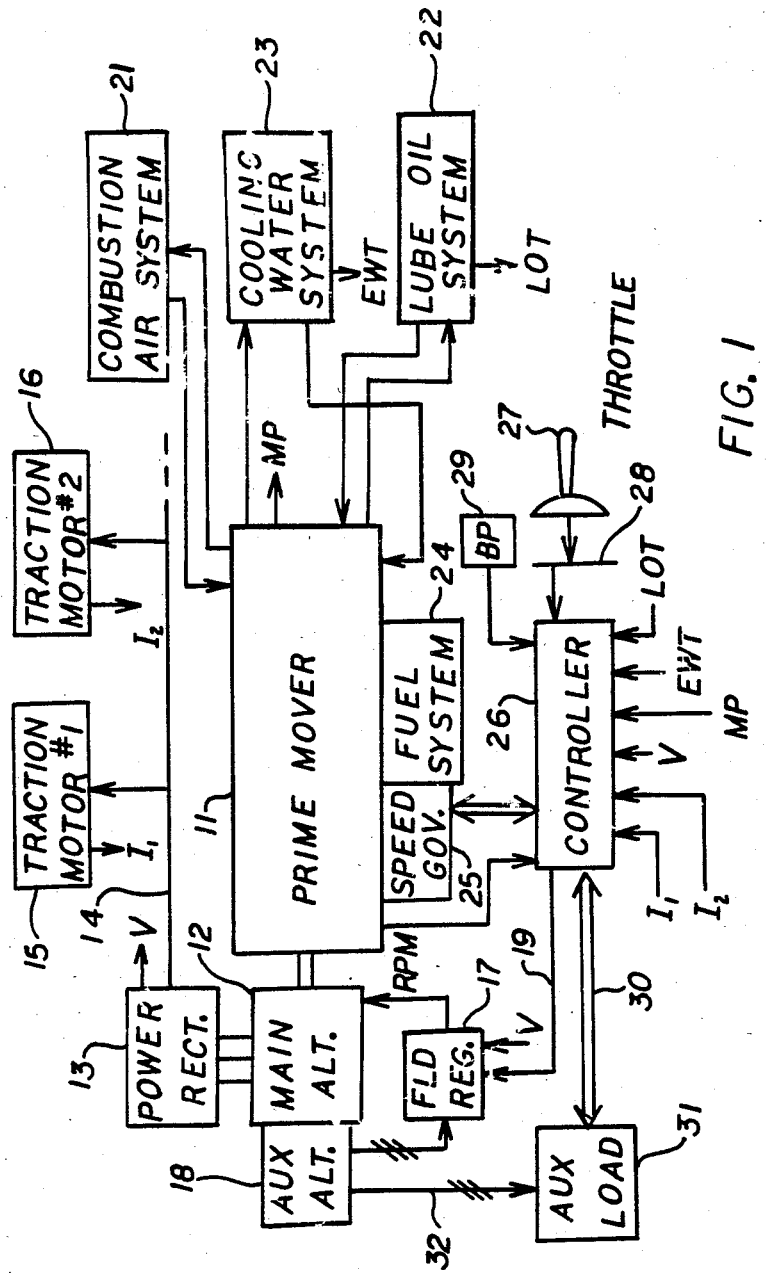
FIG. 1 is a schematic diagram of the principal components of a locomotive propulsion system, including a thermal prime mover (such as a diesel engine), a traction alternator, a plurality of traction motors, and a controller.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The 3-phase voltages generated by the main alternator 12 are applied to a-c input terminals of at least one 3-phase, double-way uncontrolled power rectifier bridge 13. The rectified electric power output of the bridge 13 is supplied, via a d-c bus 14, to parallel-connected armature windings of a plurality of d-c traction motors, only two of which (15, 16) are identified in FIG. 1. In practice a traction motor is hung on each axle of the locomotive, there are usually two or three axles per truck, and there are two trucks per locomotive. The motors have field windings (not shown) connected in series with their respective armatures during the motoring or propulsion mode of operation. Alternatively, a-c traction motors could be used, in which case suitably controlled electric power inverters would be connected between the respective motors and the d-c bus 14.

Field windings (not shown) on the rotor of the main alternator 12 are connected for energization to the output of a suitable source 17 of regulated excitation current. Preferably the source 17 comprises a 3-phase controlled rectifier bridge the input terminals of which receive alternating voltages from a prime mover-driven auxiliary alternator 18 that can actually comprise an auxiliary set of 3-phase windings on the same frame as the main alternator 12. This source includes conventional means for varying the magnitude of the direct current that it supplies to the alternator field as necessary to minimize any magnitude difference between a control signal on an input line 19 and a feedback signal V representative of the average magnitude of the output voltage of the power rectifier 13. The latter voltage magnitude is a known function of the field current magnitude and also varies with the speed of the prime mover 11.

The prime mover 11 is a thermal or internal-combustion engine or equivalent. On a self-propelled diesel-electric locomotive, the motive power is typically provided by a high-horsepower, turbocharged, 4-stroke, 16-cylinder diesel engine. Such an engine has a number of ancillary systems that are represented by labeled blocks in FIG. 1. A combustion air system 21 conventionally includes an engine exhaust gas-driven turbocharger for compressing air in the combustion air intake manifold of the engine. A lube oil system 22 conventionally includes an engine crankshaft-driven pump and associated piping for supplying suitable lubricating oil to the various moving parts of the engine. A cooling water system 23 conventionally includes a pump for circulating relatively cool water from a plurality of air-cooled heat exchangers or radiators to a lube oil cooler, to the cylinder liners of the engine for absorbing heat rejected during the combustion process, and also to "intercoolers" through which the combustion air passes after being compressed (and therefore heated) by the turbocharger. These three systems (21-23) are illustrated in more detail in FIG. 2 which will soon be described.

A diesel engine fuel system 24 conventionally includes a fuel tank, fuel pumps and nozzles for injecting fuel oil into the respective power cylinders which are arranged in two rows or banks on opposite sides of the engine, tappet rods cooperating with fuel cams on a pair of camshafts for actuating the respective injectors at the proper times during each full turn of the crankshaft, and a pair of fuel pump racks for controlling how much fuel oil flows into a cylinder each time the associated injector is actuated. The position of each fuel pump rack, and hence the quantity of fuel that is being supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed control signal received from a controller 26, which signal is herein called the speed command signal or the speed call signal.

In a normal motoring or propulsion mode of operation, the value of the engine speed call signal provided by the controller 26 is determined by the position of a handle 27 of a manually operated throttle to which the controller is coupled. A locomotive throttle conventionally has eight power positions or notches (N), plus idle and shutdown. N1 corresponds to a minimum desired engine speed (power), while N8 corresponds to maximum speed and full power. In a consist of two or more locomotives, only the lead unit is usually attended, and the controller on board each trail unit will receive, over a trainline 28, an encoded signal that indicates the throttle position selected by the operator in the lead unit.

As was explained hereinbefore, for each power level of the engine there is a corresponding desired load. The controller 26 is suitably arranged to translate the throttle notch information into a control signal of appropriate magnitude on the input line 19 of the alternator field regulator 17, whereby the traction power is regulated to match the called-for power so long as the alternator output voltage and load current are both within predetermined limits. For this purpose, and for the purpose of deration (i.e., unloading the engine) and/or limiting engine speed in the event of certain abnormal conditions, it is necessary to supply the controller 26 with information about various operating conditions and parameters of the propulsion system, including the engine and its support systems.

Figure 2:
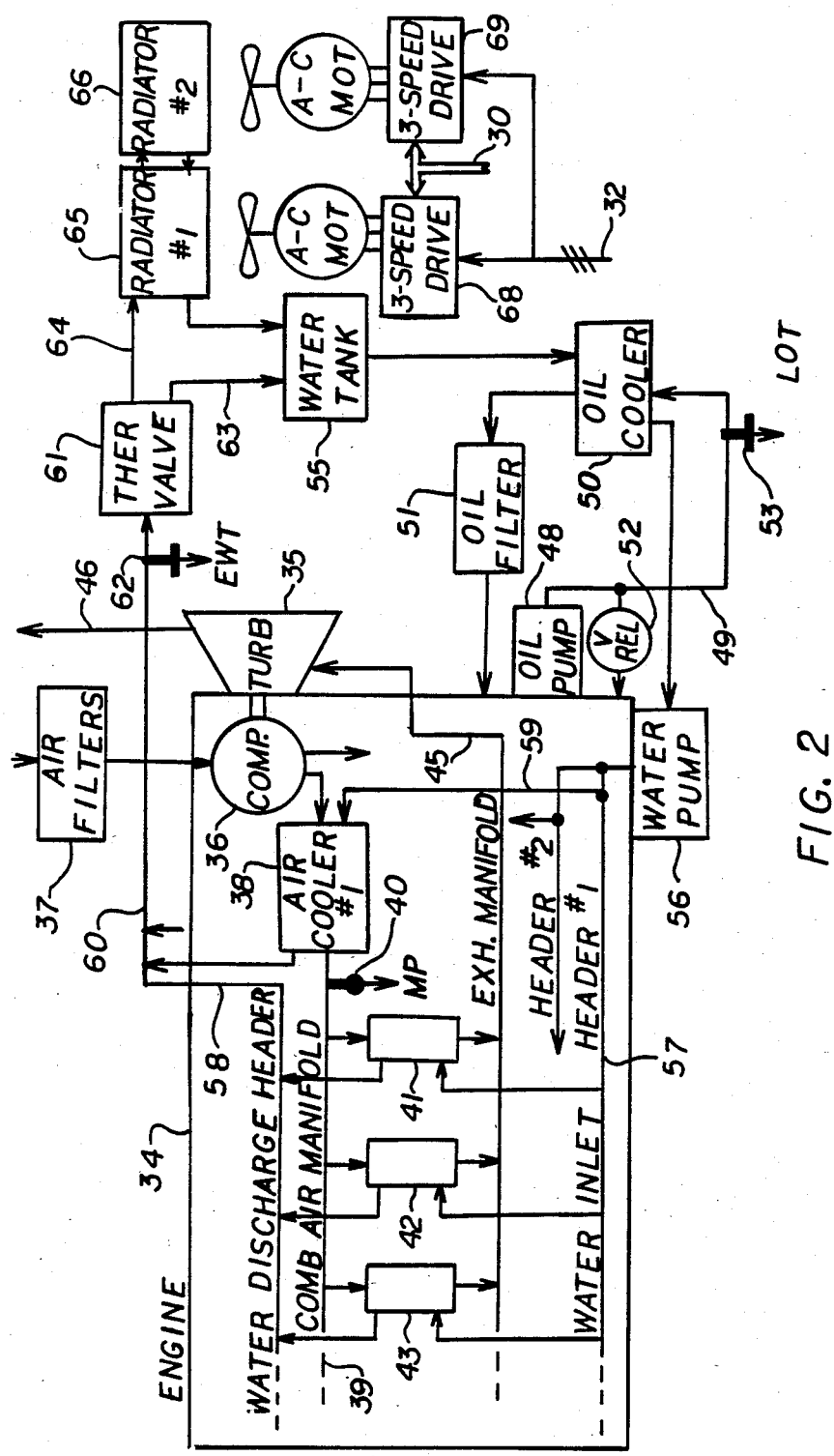
FIG. 2 is a simplified schematic diagram of the locomotive engine and the associated support systems that supply it with combustion air, lubricating oil, and cooling water.

More particularly, the controller 26 typically receives the voltage feedback signal V (representative of the average magnitude of the rectified alternator output voltage), current feedback signals I1, I2, etc. (representative, respectively, of the magnitude of current in the armature windings of the individual traction motors), and a load control signal issued by the governor system 25 if the engine cannot develop the power demanded and still maintain the called-for speed. (The load control signal is effective, when issued, to reduce the magnitude of the control signal on the line 19 so as to weaken the alternator field until a new balance point is reached.) In addition, as is illustrated in FIG. 1, the controller is supplied with an engine speed signal RPM indicating the rotational speed of the engine crankshaft, an ambient air pressure signal BP from a barometric pressure sensor 29, a combustion air pressure signal MP from a pressure sensor associated with an air intake manifold of the engine, an oil temperature signal LOT from a temperature sensor on the hot oil side of the lube oil cooler, and a water temperature signal EWT from a temperature sensor in a hot water section of the cooling water system 23. In response to the latter signal, the controller sends encoded speed control signals, via a multiline serial data link or bus 30, to radiator fan motor(s) that are part of auxiliary load equipment 31 connected for energization, via a 3-wire line 32, to a suitable source of a-c electric power (e.g., the engine-driven auxiliary alternator 18), whereby the flow of air across the heat exchange tubes of the radiators is controlled as a function of water temperature so as to maintain a relatively constant engine operating temperature over the load range of the engine and with wide variations in ambient temperature. FIG. 2 shows the cooling water and combustion air systems in more detail.

In FIG. 2 the diesel engine is represented by the block 34. At one end of the engine, opposite to the alternator end, the turbocharger in the combustion air system is mounted on the engine frame. The turbocharger comprises a gas turbine 35 the output shaft of which drives a centrifugal air compressor 36. Clean air is collected in a plenum, passed through an array of air filters 37, delivered to a central inlet of the compressor 36, and discharged (at elevated pressure and temperature) through alternative peripheral outlets on opposite sides of the engine. The compressed air that is discharged from each of the two outlets passes through an associated air-water heat exchanger (commonly referred to as either an intercooler or an aftercooler) and into a combustion air intake manifold. FIG. 2 shows only one air cooler 38 and one intake manifold 39 on the near side of the engine and does not show the duplicate cooler and the duplicate manifold that are conventionally disposed on the far side. A manifold pressure sensor 40 is connected to the intake manifold 39. From the manifold 39 the compressed air is supplied to a bank of power cylinders on the same side of the engine. While only three cylinders 41, 42, and 43 are shown, in practice each intake manifold supplies combustion air to eight cylinders of a 16-cylinder engine, or six cylinders of a 12-cylinder engine, or four cylinders of an 8-cylinder engine.

The gases produced during combustion are exhausted from each of the cylinders into an exhaust manifold 45. The exhaust gases drive the turbine 35 prior to their discharge through an exhaust stack 46 to the atmosphere. Turbine speed increases as the engine develops more power. With the engine running at or near full power, the compressor 36 is effective to compress the combustion air in the intake manifolds (39) to more than twice atmospheric pressure. The intercoolers (38) are then effective to lower the temperature of the compressed air (which was heated appreciably during the compression process), thereby improving thermal efficiency, reducing fuel consumption, and lowering the thermal loading of the engine.

In the lube oil system that is illustrated in FIG. 2, hot engine lubricating oil from the crankcase near the bottom of the engine 34 is pumped by an engine-driven pump 48 into a pipe 49 connected to the inlet of an oil-water heat exchanger 50, and cooled oil flows from 50 through an oil filter 51 and another pipe to an oil supply header (not shown). From the supply header within the main frame of the engine, the oil is distributed to various bearings, valves, pistons, gears, and other moving parts of the engine for lubricating and/or cooling purposes. A conventional pressure relief valve 52 connects the lube oil pipe 49 to the oil pan, and a temperature sensing device 53 is exposed to the oil flowing in the pipe 49 near the inlet of the oil cooler 50. Preferably the lube oil temperature sensor 53 comprises a conventional thermistor.

As is indicated in FIG. 2, the engine cooling water system comprises a water storage tank 55 from which relatively cool water flows, via heat exchange tubes inside the oil cooler 50, to the suction side of an engine-driven water pump 56. The pump raises the pressure of the water which then flows into a pair of inlet headers on opposite sides of the engine. Water in the first inlet header 57 passes in parallel through the individual cylinder jackets of the bank of cylinders on the near side of the engine to a common water discharge header 58 that is centrally located above the two banks of cylinders. The inlet and discharge headers 57 and 58 are also interconnected by a water branch comprising a pipe 59 and the case of the first combustion air cooler 38. A similar branch enables cooling water to flow from the second inlet header through the second intercooler (not shown) on the far side of the engine. The system is balanced hydraulically so that the flow rate to the two intercoolers is in the desired ratio to the flow rate to the cylinder jackets.

Hot water leaving the engine from the discharge header 58 flows through a pipe 60 to at least one thermostatically controlled bistable fluid valve 61. A temperature sensing device 62 (preferably another thermistor) is exposed to the water flowing in the pipe 60 near the inlet port of the valve 61. The valve 61 has two outlet ports that respectively communicate with two water channels 63 and 64. Whenever the temperature of the water entering the valve is lower than a predetermined threshold, or whenever the water pressure is lower than a predetermined level (i.e., whenever the engine speed is so low that the water pump 56 is unable to raise the water pressure to such a level), all of the water is diverted via the radiator bypass channel 63 to the storage tank 55. Otherwise the water flows into the channel 64 which feeds a bank of two or more water-air heat exchangers or radiators 65 and 66, and after being cooled in these radiators the water is discharged into the tank 55. In practice an additional bank of radiators (not shown), disposed in parallel with the illustrated bank, is connected to a second thermostatically controlled bistable fluid valve whose threshold temperature can differ slightly from that of the first valve 61. The radiators are disposed at a higher elevation than the storage tank 55, and water will quickly and completely drain from them after each cooling cycle. It should be noted here that if and when the radiators 65, 66 are bypassed due to insufficient water pressure (which in turn is due to the engine running at low speed, e.g., under 400 rpm), the water will be cooled while traversing the intercoolers (38) because the combustion air, being only moderately compressed when the turbocharger speed is low (as is true when the engine is lightly loaded) is then cooler than the water. This cooling effect, plus the rejection of heat directly from the engine and its associated cooling water and lube oil systems by radiation and convection, keeps the engine from overheating at low speed.

Cooling air is blown through the radiators by a pair of fans whose blades are respectively driven by two variable speed 3-phase induction motors. Alternating voltages are applied to these fan motors from the respective outputs of a pair of 3-speed motor drive systems 68 and 69. The inputs of both of the latter drives are connected to the line 32 which in turn is energized by the output of an engine-driven auxiliary alternator, whereby the fundamental frequency of the applied voltages (and hence full speed of the fans) tends to vary with engine speed. Each of the drives 68 and 69 is suitably constructed and arranged to reduce this frequency on command so that the associated fan can run at less than full speed. Separate speed commands for the respective drives are provided by the controller 26 (FIG. 1) over the bus 30 in the form of suitably encoded signals that indicate whether full, reduced, or zero speed is desired. Preferably each fan motor drive comprises the improved "cycle-skipping" speed control system that is disclosed and claimed in U.S. Pat. No. 4,461,985 granted on July 24, 1984, to T. D. Stitt and assigned to General Electric Company, and its controls are programmed to provide both half and quarter speed alternatives to full speed.

While the engine cooling system illustrated in FIG. 2 and described above is a pressurized, dry-radiator type that employs water as the working coolant, persons skilled in the art will understand that other types and other fluids could alternatively be used. In any event, the majority (almost 80%) of the total heat absorbed by the cooling system is transferred directly from the engine to the coolant, and the remainder is transferred first to the lube oil and then through the oil cooler 50 to the coolant. The speeds of the two radiator fan motors are suitably changed as a function of the coolant temperature (as detected by the sensor 62) so as to maintain this temperature in a normal range of approximately 180 to 200 degrees Fahrenheit (F) under most conditions.

Figure 3:
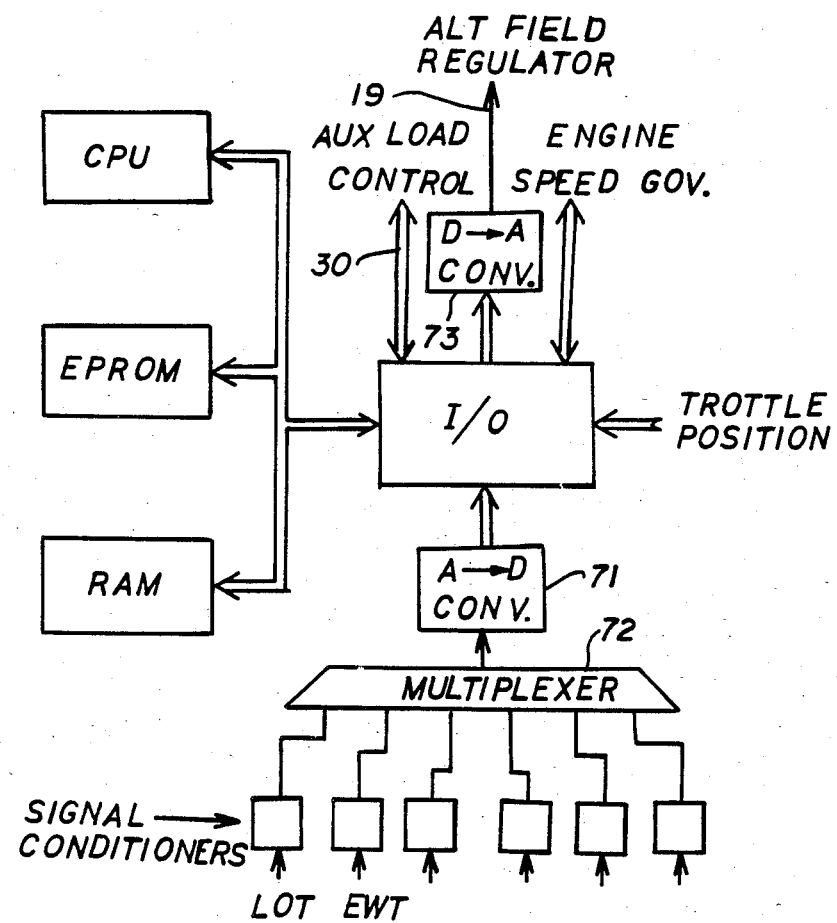
FIG. 3 is an expanded block diagram of the controller (shown as a single block in FIG. 1) which produces output signals for respectively controlling the rotational speed of the engine, the field excitation of the alternator, and the energization of certain auxiliary electrical loads.

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 3, a central processing unit (CPU) executes an operating program stored in an erasable and electrically reprogrammable read only memory (EPROM) which also stores tables and data utilized in the program. Contained within the CPU are conventional counters, registers, accumulators, flip flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 3 represent conventional peripheral and interface components that interconnect the microcomputer and the external circuits of FIG. 1. More particularly, the block labeled "I/O" is an input/output circuit for supplying the microcomputer with data representative of the selected throttle position and with digital signals representative of the readings of the various voltage, current, speed, pressure, and temperature sensors associated with the locomotive propulsion system. The latter signals are derived from an analog-to-digital converter 71 connected via a conventional multiplexer 72 to a plurality of signal conditioners to which the sensor outputs are respectively applied. The signal conditioners serve the conventional dual purposes of buffering and biasing the analog sensor output signals. As is indicated in FIG. 3, the input/output circuit also interconnects the microcomputer with the auxiliary load controls (via the multiline bus 30), the engine speed governor, and a digital-to-analog signal converter 73 whose output is connected via the line 19 to the alternator field regulator.

The controller 26 is suitably programmed to impose certain temperature-responsive restraints or limits on the engine speed command signal that it provides for the governor system 25. Under normal propulsion conditions the value of this signal varies with the speed selected by the locomotive operator, as indicated by the throttle-position signal that the controller receives over the trainline. But when the throttle handle is in its idle position, the controller 26 actually calls for an engine speed that is a function of the engine cooling water temperature (EWT). Furthermore, if either the water temperature or the engine lube oil temperature (LOT) rises above a predetermined high magnitude (e.g., 240° F.), the controller calls for idle speed regardless of the throttle position.

In accordance with the present invention, the controller is also programmed automatically to limit maximum engine speed as a function of the temperature of the lubricating oil until the oil has warmed up. More particularly, if the value of the temperature signal LOT is lower than a first predetermined level, indicating that the lube oil is relatively cool (e.g., cooler than 90° F.), the controller will not command more than a relatively low engine speed (e.g., the speed normally called for when the throttle handle is in notch 1), whereas if the lube oil temperature is in a predetermined warm range, as indicated by LOT being above the first level but lower than a second predetermined higher level (corresponding, e.g., to 140° F.), the controller prevents the engine from operating faster than a predetermined intermediate speed (e.g., the N4 speed). Otherwise, when the lube oil is hotter than the aforesaid warm temperature range, normal maximum speed (N8) is permitted.

Figure 4:
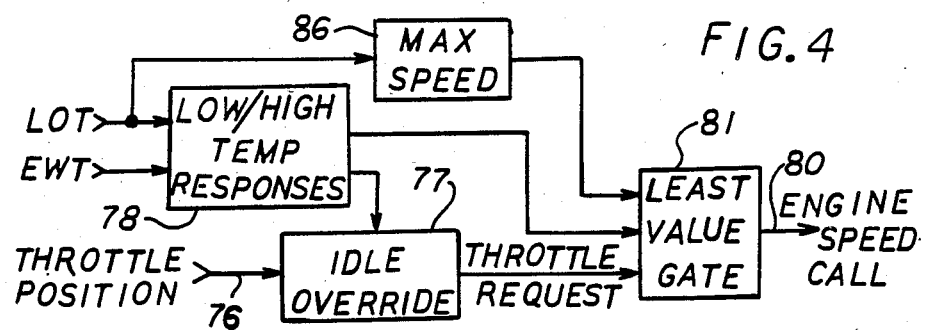
FIG. 4 is a diagram of an "equivalent circuit" that is used to illustrate the manner in which the engine speed command signal is produced by the controller shown in FIG. 3.

The above-mentioned speed limit functions of the controller 26 can be better understood with the aid of FIG. 4 which illustrates that a throttle position indicating signal on an input line 76 is fed to an "idle override" functional block 77. The output of the block 77 is throttle request data. Normally the throttle request is the same as the throttle position. But whenever the throttle position equals "idle," the signal on line 76 is modified by the idle override function, and the throttle request is then determined by the value of the engine cooling water temperature indicating signal EWT which is supplied to the function 77 via an associated functional block 78 labeled "low/high temp. responses."

As is indicated in FIG. 4, the throttle request from the idle override block 77 is fed to an engine speed call line 80 via an auctioneering functional block 81 labeled "least value gate," where it is compared with two additional inputs so that the actual value of the speed command signal is the same as the input of lowest value. One of the additional inputs to the gate 81 is provided by the block 78. This input has a normally high value, but if either one of the two temperature indicating signals LOT and EWT attains the aforesaid predetermined high magnitude, its value is reduced to a number corresponding to idle speed. The other additional input to the gate 81 is provided by a "maximum speed" functional block 86 which in turn is responsive to the lube oil temperature LOT.

Figure 5:
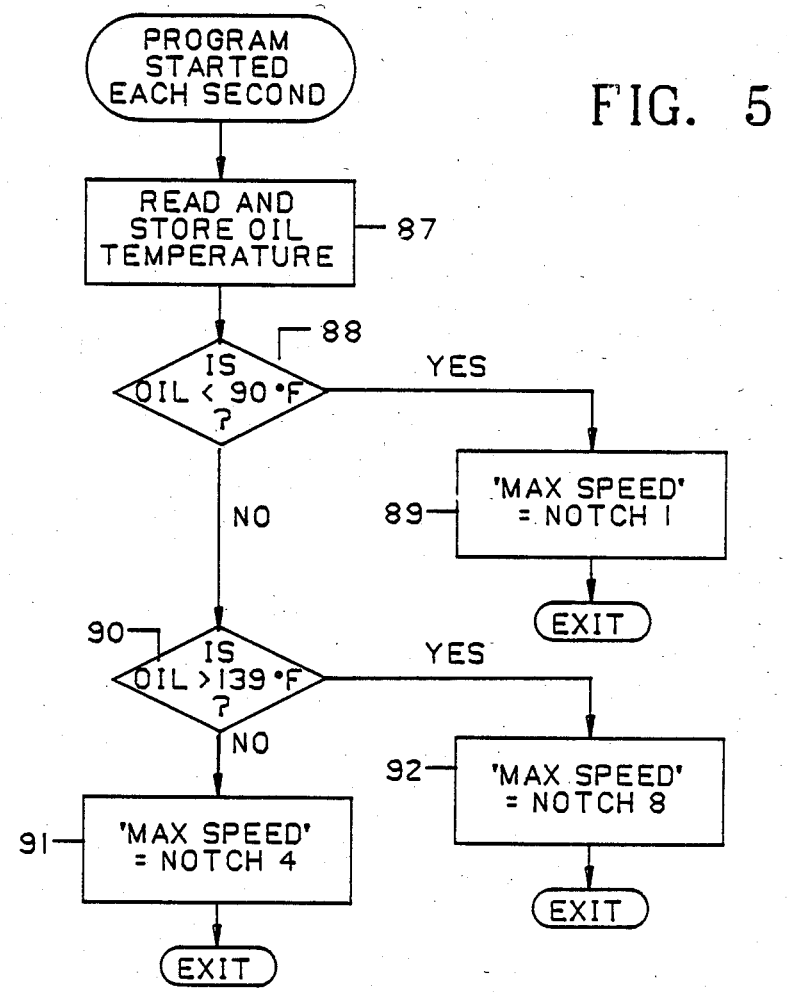
FIG. 5 is a flow chart that explains the operation of the preferred embodiment of the maximum speed function illustrated in FIG. 4.

In the presently preferred embodiment of the invention, the function performed by the maximum speed block 86 is implemented by programming the microcomputer to execute the routine that is illustrated in FIG. 5. This routine is repeated 60 times a minute. It starts with a step 87 of reading and storing the magnitude of the signal LOT which is a measure of the temperature of the lube oil flowing out of the engine. Upon completing step 87, the routine proceeds to an inquiry point 88 which determines whether or not the stored magnitude is under a number corresponding to a predetermined minimum temperature level (e.g., 90° F.) which is relatively cool. In response to an affirmative answer, the next and final step 89 in the FIG. 5 routine is to set the maximum engine speed at a first predetermined low magnitude (e.g., approximately 440 rpm, which is the notch 1 speed). In effect, the input that the least value gate 81 (FIG. 4) will now receive from the maximum speed block 86 has a value equal to an N1 throttle request, and the gate 81 will not pass any higher throttle request to the engine speed call line 80.

If the oil temperature is not below the predetermined minimum level, the FIG. 5 routine proceeds from point 88 to another inquiry point 90 which determines whether or not the stored magnitude of LOT is over a number corresponding to another predetermined temperature level (e.g., 139° F.) which is higher than the minimum level. In response to a negative answer, the next and final step 91 in the FIG. 5 routine is to set the maximum engine speed at a second predetermined magnitude which is higher than the magnitude set in step 89 but lower than the normal maximum engine speed. Preferably the second magnitude is approximately 770 rpm, which is the notch 4 speed. In effect, the input that the gate 81 now receives from the block 86 has a value equal to an N4 throttle request, and the speed command signal on line 80 can be no higher. On the other hand, if the inquiry 90 determines that lube oil is hotter than the predetermined higher temperature level, the routine proceeds to an alternative step 92 which sets the maximum engine speed at the highest permissible magnitude (i.e., the notch 8 speed), thereby allowing the speed command signal to exceed the N4 value upon request.

In the above-described manner, engine speed is automatically limited to a safe maximum whenever the lube oil is relatively cool. The controller prevents the engine speed call signal from exceeding (1) a relatively low value if the temperature of the lube oil is below the preset minimum level and (2) a predetermined intermediate value if the lube oil temperature is neither below this minimum nor above the higher level referenced at step 90 of the maximum speed program. As a result, the engine cannot be commanded to run at high speeds, regardless of the position of the throttle handle, unless the lube oil is sufficiently warmed up. Before the lube oil warms up, it has a relatively high viscosity which impedes its lubricating function and also interferes with proper operation of the lube oil pressure relief valve 52 (FIG. 2). Allowing the engine crankshaft to turn at a fast rate while the lube oil is cold could damage not only the engine but also, due to abnormally high pressure in the lubricating oil system, the engine-driven lube oil pump, the oil filter, and the gaskets of the oil cooler. This risk is appreciably reduced by utilizing the present invention for automatically restricting the maximum speed of the engine to that of N5 or lower (preferably N4) when the lube oil temperature is in the range of 90–140° F. and to that of N3 or lower (preferably N1) when the lube oil temperature is less than 90° F.

While a preferred embodiment of the invention has been shown and described by way of example, many modifications will undoubtedly occur to persons skilled in the art. The concluding claims are therefore intended to cover all such modifications as fall within the true spirit and scope of the invention.

I claim:

1. In a system comprising a variable-speed prime mover, means including an oil cooler for supplying lubricating oil to the prime mover, throttle means for selecting the operating speed of the prime mover, a controller coupled to the throttle means for providing a speed command signal having a value that normally varies with the selected speed, and speed control means responsive to the command signal for regulating the actual speed of the prime mover, the improvement comprising:
    a. means for sensing the temperature of the lubricating oil on the hot oil side of the oil cooler; and
    b. maximum speed limiting means associated with the controller and connected to said temperature sensing means for preventing the speed command signal from exceeding a predetermined relatively low value if the sensed oil temperature is below a preset minimum level and for preventing the speed command signal from exceeding another predetermined value which is higher than said predetermined low value if the sensed oil temperature is in a range above said minimum level but not above a predetermined higher level.

2. The improvement as in claim 1, in which said maximum speed limiting means allows the speed command signal to exceed said predetermined higher value if the sensed oil temperature is above said last-mentioned higher level.

3. The improvement as in claim 1, in which said preset minimum temperature level is approximately 90° F.

4. The improvement as in claim in which said predetermined higher temperature level is approximately 140° F.

5. The improvement as in claim 4, in which said preset minimum temperature level is approximately 90° F.

6. The improvement of claim 1 for a system the lubricating oil supplying means of which includes an oil pump driven by the prime mover.

7. In a locomotive propulsion system comprising a variable-speed prime mover on board the locomotive, means including an oil pump driven by the prime mover, an oil cooler and an oil filter for supplying lubricating oil to the prime mover, throttle means including a manually operated handle having eight discrete power positions for selecting incrementally higher prime mover speeds as the handle is moved from its first to its eight positions, a controller coupled to the throttle means for providing a speed command signal having a value normally determined by the position of the throttle handle, and speed control means responsive to the command signal for regulating the actual speed of the prime mover, the improvement comprising:
    a. means for sensing the temperature of the lubricating oil on the hot oil side of the oil cooler; and
    b. maximum speed limiting means associated with the controller and connected to said temperature sensing means for preventing the speed command signal from exceeding a predetermined relatively low value if the sensed oil temperature is below a preset minimum level.

8. The improvement as in claim 7, in which said predetermined low value is no higher than the speed command signal value that normally corresponds to the third position of the throttle handle.

9. The improvement as in claim 8, in which said preset minimum temperature level is approximately 90° F.

10. The improvement as in claim 7, in which said maximum speed limiting means is also effective to prevent the speed command signal from exceeding another predetermined value which is higher than said predetermined low value if the sensed oil temperature is in a range above said minimum level but not above a predetermined higher level.

11. The improvement as in claim 10, in which said predetermined higher value is no higher than the speed command signal value that normally corresponds to the fifth position of the throttle handle.

12. The improvement as in claim 11, in which said preset minimum temperature level is approximately 90° F. and said predetermined higher temperature level is approximately 140° F.

13. The improvement as in claim 10, in which said predetermined low value of the speed command signal is no higher than the value that normally corresponds to the third position of the throttle handle.

14. The improvement as in claim 13, in which said predetermined higher value of the speed command signal is no higher than the value that normally corresponds to the fifth position of the throttle handle.

15. The improvement as in claim 14, in which said preset minimum temperature level is approximately 90° F. and said predetermined higher temperature level is approximately 140° F.

* * * * *